July 26, 1927.
L. W. HELMLING
VEHICLE ATTACHMENT
Filed Aug. 3, 1925
1,636,997
3 Sheets-Sheet 2
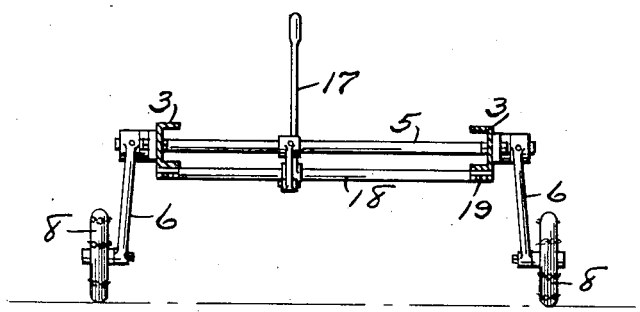
Fig. 2.
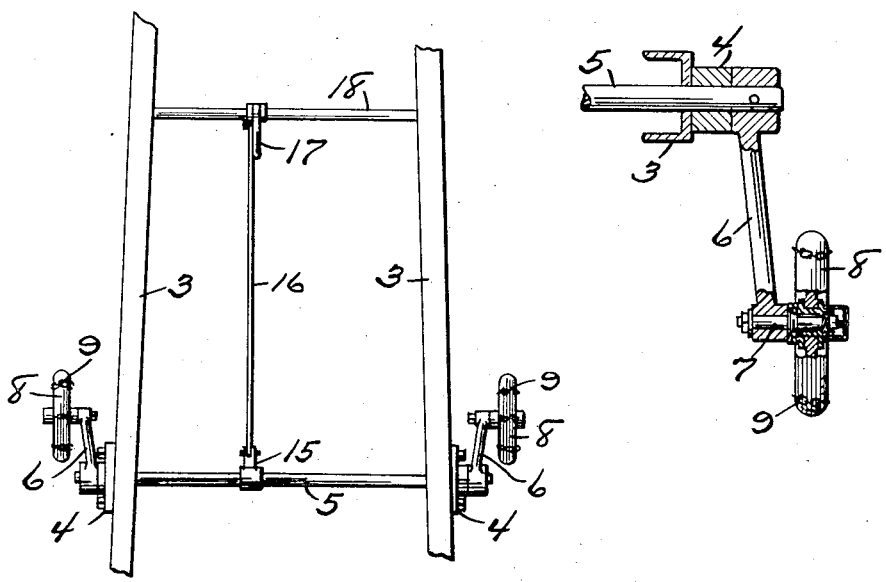
Fig. 3.
Fig. 4.
Leon W. Helmling
INVENTOR
BY Victor J. Evans
ATTORNEY
WITNESS:

July 26, 1927.
L. W. HELMLING
1,636,997
VEHICLE ATTACHMENT
Filed Aug. 3, 1925
3 Sheets-Sheet 3
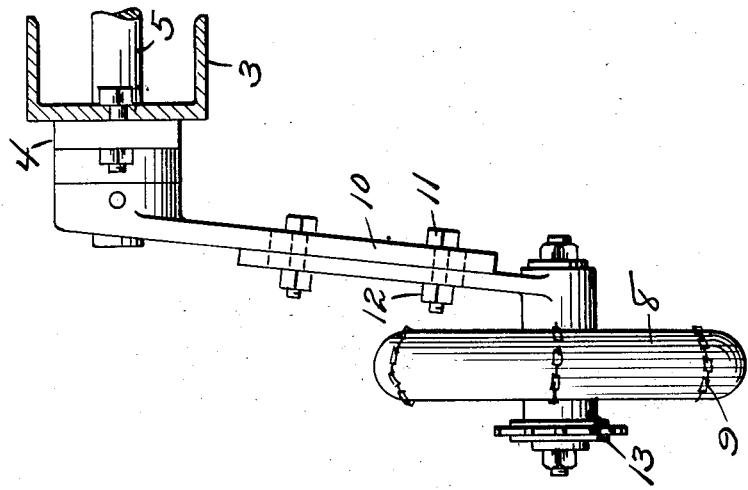
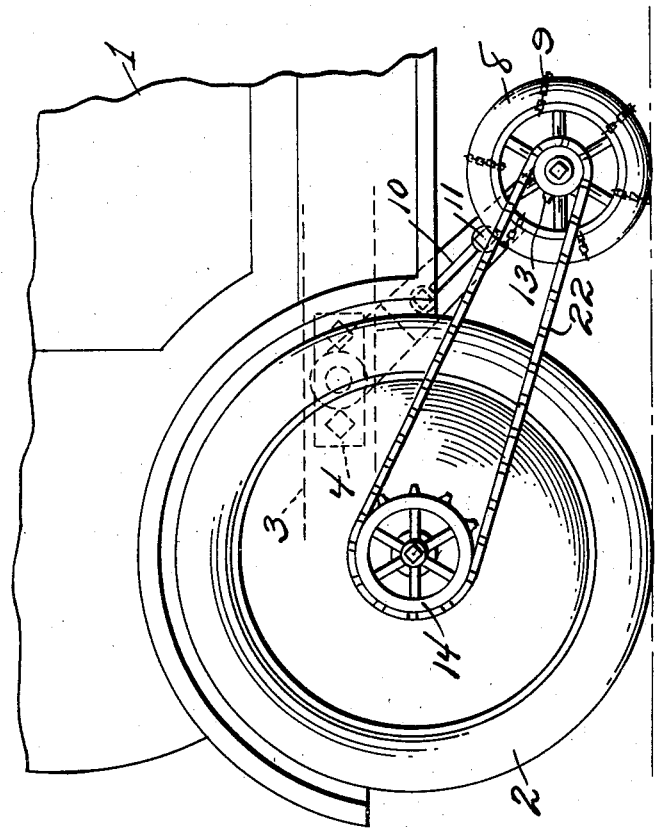

Patented July 26, 1927.

1,636,997

UNITED STATES PATENT OFFICE.

LEON W. HELMLING, OF BALTIMORE, MARYLAND.

VEHICLE ATTACHMENT.

Application filed August 3, 1925. Serial No. 47,901.

My present invention has reference to an attachment for vehicles, and is primarily designed for use in connection with motor driven vehicles, such as automobiles, trucks, etc.

An object is the provision of this class of vehicles with an attachment in the nature of a friction wheel so mounted as to be normally raised above the ground out of the path of obstruction, but likewise movable against the drive wheels of the automobile and into ground engagement for effectively braking the vehicle, the friction wheel being likewise adjustably mounted on its support, whereby the same may be swung to ground engagement forward of the drive wheels to serve as anti-skid devices for the vehicle, and further wherein the friction wheel, if desired, may when in its last mentioned position, be driven by the drive wheels.

A still further object is the provision of an attachment of this character which may be cheaply constructed and easily and quickly arranged upon any ordinary construction of vehicles, and effectively held in either inoperative or operative positions.

A further object is the provision of calk carrying friction wheels mounted, in a novel manner, directly forward of the drive wheels of an automobile, normally sustained forward therefrom out of ground contacting engagement, swingable to contact with the drive wheels of the vehicle and to engage with the ground surface to brake the automobile, and adjustable on their supports and movable into ground contacting engagement forward of the said drive wheels and revoluble by and with the said drive wheels for providing anti-skidding means for the vehicle and likewise providing the vehicle with an extricating means for pulling the same out of ruts.

With the above broadly stated objects in view, and others which will appear as the nature of the invention is better understood, reference is to be had to the accompanying drawings in which there is illustrated a satisfactory embodiment of the improvement as it now appears to me, it being understood, however, that the drawings are merely illustrative and that such changes may be made therefrom as fairly fall within the scope of what I claim.

In the drawings:—

Figure 2 is a transverse sectional view through the frame of the automobile illustrating the arrangement of my improvement thereon.

Figure 3 is a top plan view of the construction illustrated in Figure 2.

Figure 4 is an enlarged sectional view approximately on the line 4—4 of Figure 3, a portion of the friction wheel being in section.

Figure 5 is a fragmentary side elevation showing the mount for the friction wheel adjusted to arrange the same forward of the drive wheels of the automobile and driven by said drive wheels, as when the improvement is employed to prevent the skidding of the automobile.

Figure 6 is a front elevation of the improvement, one of the channeled side members of the vehicle frame being in section.

Figure 1:
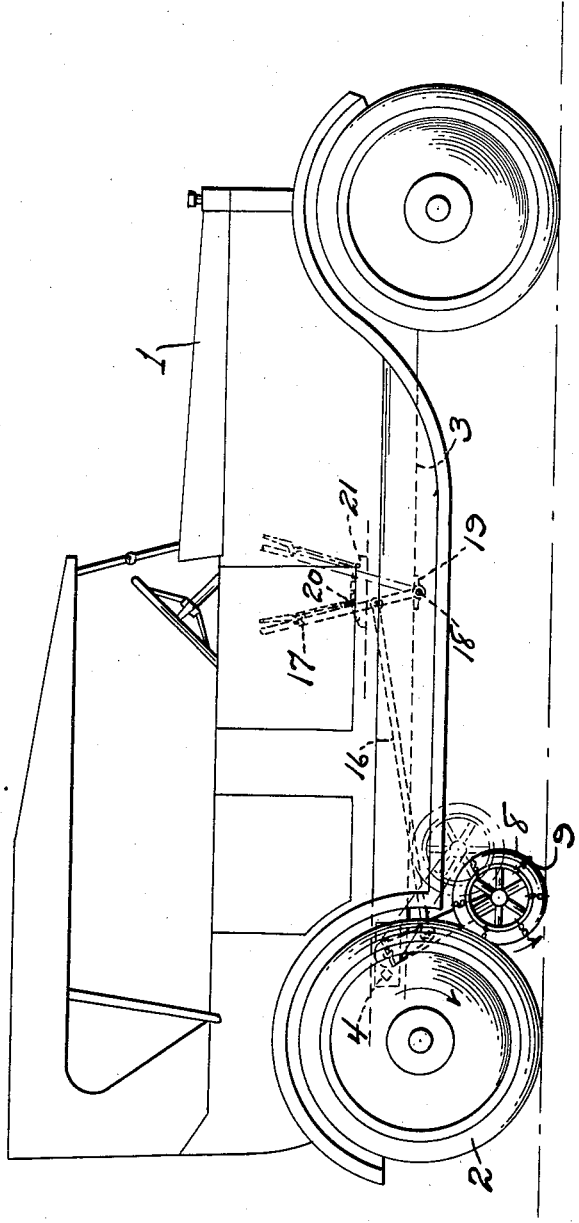
Figure 1 is a side elevation of an automobile, illustrating the application of my improvement thereon, the dotted lines showing the position of the improvement when in inoperative position.

Referring now to the drawings in detail, the numeral 1 designates an ordinary construction of automobiles and 2 the power or drive wheels therefor. Of course, my improvement is not necessarily restricted to employment in connection with the type of automobile shown, as the same may be successfully employed upon any class of vehicles, preferably though of the motor driven type.

The channeled side members for the frame of the automobile are indicated, in the drawings, by the numeral 3. These members 3, forward of the rear axle housing of the machine, have secured on their outer faces bearings 4 for a transversely arranged shaft 5. Fixed on the ends of the shaft 5 there are depending arms 6 which provide the mount for the friction wheels which form important elements of the improvement. The arms 6 have their outer ends formed with bosses through which pass shafts 7 that carry antifrictional bearings for the hubs of the friction wheels 8. In the showing of the drawings, the friction wheels are comparatively small and are provided with pneumatic tires. In this connection it is to be stated that the threads of the wheels may be of any desired construction, and also in this case it may be well to state that the thickness of the thread of the wheels 8 approximately equals that of the tires on the drive wheels 2 of the automobile. Each wheel 8 has peripheral calks 9. As shown in the drawings, these calks are in the nature of transverse chains but may, of course, be in the nature of other removable elements or as a matter-of-fact, the calks may be integrally formed on the periphery of the wheels 8.

The arms 6 are preferably in the nature of flat plates which are in contacting engagement with each other, one of said plates being provided with an elongated slot 10 that receives therethrough the shanks of bolts 11 carried by the second plate. The bolts are, of course, engaged by nuts 12. In this manner the mount for each of the friction wheels is adjustable, and the purpose of such arrangement will presently be apparent. Also the wheels 8 may and preferably have secured on their outer faces sprocket wheels 13 and the hubs of the drive wheels 2 are likewise provided with sprocket wheels 14.

The shaft 5 has fixed thereon an angle finger 15 to which is pivotally connected a rod 16. The rod 16 has a pivotal connection with a lever 17. In the showing of the drawings, the lower end of the lever 17 is journaled on a transverse shaft 18 that has its ends mounted in suitable bearings 19 secured to the under face of the side members 3 of the automobile frame. Of course, the lever may be otherwise supported. The lever carries a hand operated spring influenced dog 20 which is engageable with the teeth of an arched rack 21, suitably secured in the automobile forward of the front seat therein. The lever 17 is thus conveniently arranged for operation by the driver of the machine and it will be apparent that by the swinging of the lever to the rear dotted line position in Figure 1 of the drawings, a pressure will be exerted against the rod 16 to swing the shaft 5 and consequently to turn the mounts for the friction wheels 8. In the construction disclosed in Figure 1 of the drawings the friction wheel will first be brought into contacting engagement with the tire of the wheel 2 and thereafter into frictional contact with the ground surface. Any tendency of the wheels 2 to turn will cause the friction wheels to turn in an opposite direction, incident to the contacting engagement of the friction wheels with the drive wheels, with a result that as soon as the said wheels are in such contacting engagement and the friction wheels in contact with the ground surface, a forward movement of the vehicle will be easily, quickly and positively prevented.

When the sections comprising the mounts for the friction wheels are extended, however, as disclosed in Figures 5 and 6 of the drawing, the said friction wheels, when swung by the operation of the lever 17 to ground contacting engagement, will be disposed forward of the drive wheels 2 of the automobile. A chain 22 is trained around the sprocket wheels 13 and 14. so that the friction wheels will be revolved by the drive wheels of the automobile. The calks of the friction wheels contacting with the ground surface will serve as a means for extricating the machine should the same travel in ruts or through sandy roadways. When the friction wheels are arranged in the last mentioned position and the chain 22 is not trained around the sprocket wheels the friction wheels will prevent the skidding of the vehicle during its travel over wet or slippery surfaces.

From the foregoing description when taken in connection with the drawings, it will be noted that I have produced a simple construction which may be easily applied to any ordinary class of vehicles, preferably of the motor driven type, which will effect in stopping the vehicle in an easy, quick and thoroughly effective manner and which also provides a positive anti-skidding device for the vehicle. It will be further noted that when the lever is to be swung to its forward position the friction wheels will be elevated and sustained beneath the vehicle out of the path of contact with obstacles on the roadway.

Having described the invention, I claim:—

A vehicle attachment including a supporting shaft, depending arms at the ends of said shaft, stub shafts at the outer ends of said arms, friction wheels mounted on said stub shafts and disposed outwardly of the arms, peripheral calks carried by said friction wheels and means having connection with the shaft whereby to raise and lower the friction wheels relative to the surface over which the vehicle is traveling, said wheels movable for disposition in front of the rear wheels of the vehicle and inoperatively disposed above the surface but in alinement with the wheels, said raising and lowering means including a rod connected to the shaft and a hand operated lever pivotally mounted at the forward portion of the vehicle and in close proximity to the steering mechanism.

In testimony whereof I affix my signature.

LEON W. HELMLING.